United States Patent [19]
Levake et al.

[11] 4,364,175
[45] Dec. 21, 1982

[54] GRADE LINER

[76] Inventors: Richard N. Levake, 814 Ash St., Spooner, Wis. 54801; Archibald E. Ferguson, 330 E. Concorda Dr., Tempe, Ariz. 85282

[21] Appl. No.: 171,249

[22] Filed: Jul. 22, 1980

[51] Int. Cl.³ ............................................. G01B 11/00
[52] U.S. Cl. ................................... 33/1 H; 33/1 LE; 33/292; 33/353; 33/399
[58] Field of Search .......... 33/1 H, 1 LE, 273, 275 R, 33/290, 295, 342, 292, 340, 353, 354, 399, 291

[56] References Cited
U.S. PATENT DOCUMENTS

| | | | |
|---|---|---|---|
| 383,767 | 5/1888 | Reichenbach | 33/290 |
| 414,232 | 11/1889 | Lowe | 33/342 X |
| 2,096,638 | 10/1937 | Higgins, Jr. | 33/290 |
| 2,753,633 | 7/1956 | Calver | 33/1 H |
| 2,762,128 | 9/1956 | Whelan | 33/290 |
| 2,863,219 | 12/1958 | Whelan | 33/292 |
| 2,873,529 | 2/1959 | Hogan et al. | 33/1 H |
| 2,879,598 | 3/1959 | Noble | 33/342 X |
| 4,274,203 | 6/1981 | Vasile | 33/1 H |

Primary Examiner—William D. Martin, Jr.
Attorney, Agent, or Firm—James F. Duffy

[57] ABSTRACT

A grade liner which is used in cooperation with grade stakes to determine the grade within a ditch. Means are provided for establishing a horizontal line of sight a selected rise distance "A" above a grade stake. Plumb means are provided which intersect the established horizontal sight line a given offset distance from said stake. The plumb means is calibrated such that the zero calibration is located a selected distance related to said rise distance "A" from the lower end of said plumb means. In a preferred embodiment of the invention, optical means, such as a target sighting rifle scope, are utilized in establishing a desired horizontal sight line. For the plumb means, a surveyor's tape measure may be utilized when coupled to a plumb bob, the length of which bob is selectively determinable and related to the distance said sight line lies above the grade stake.

11 Claims, 3 Drawing Figures

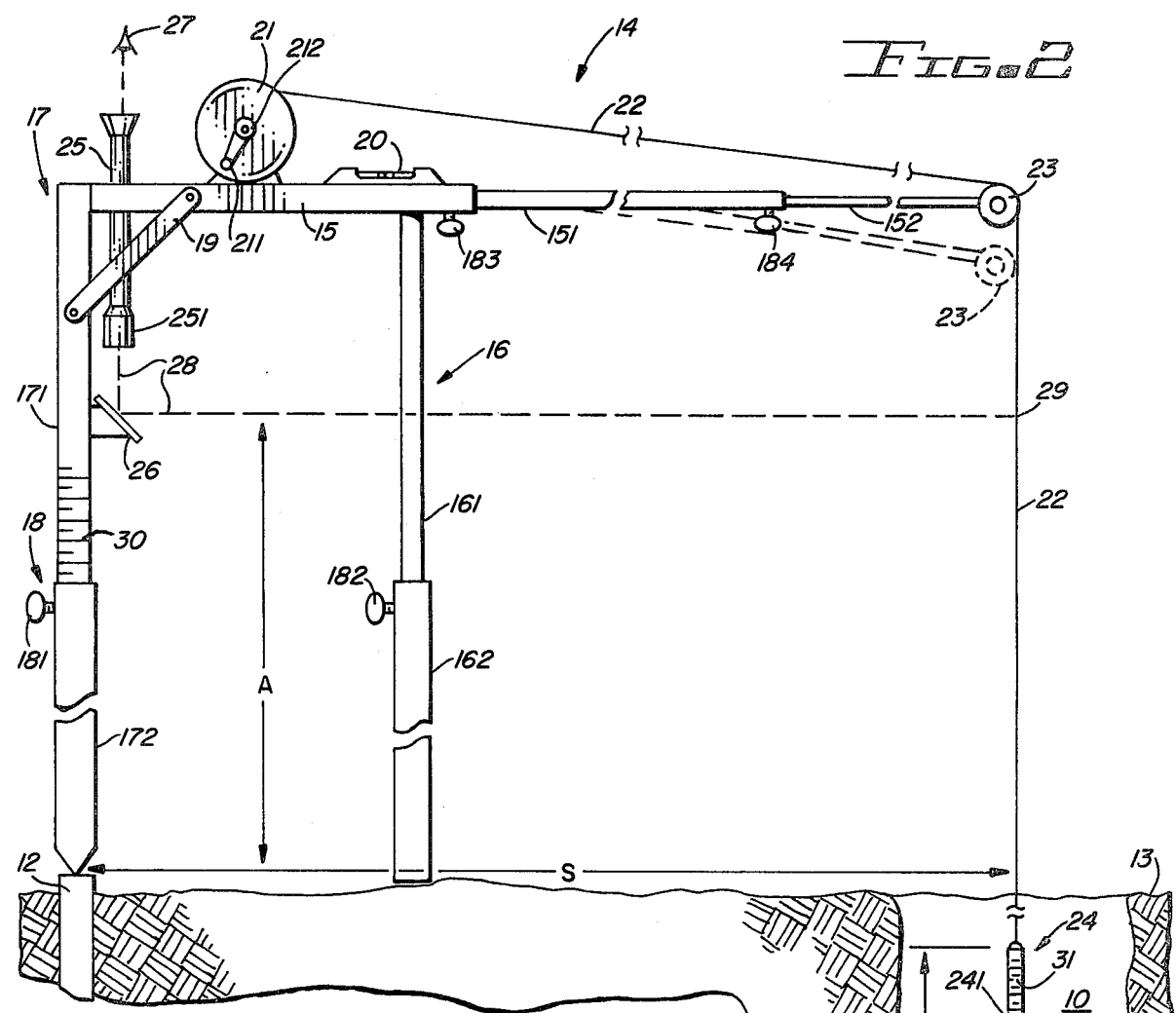
Fig. 2
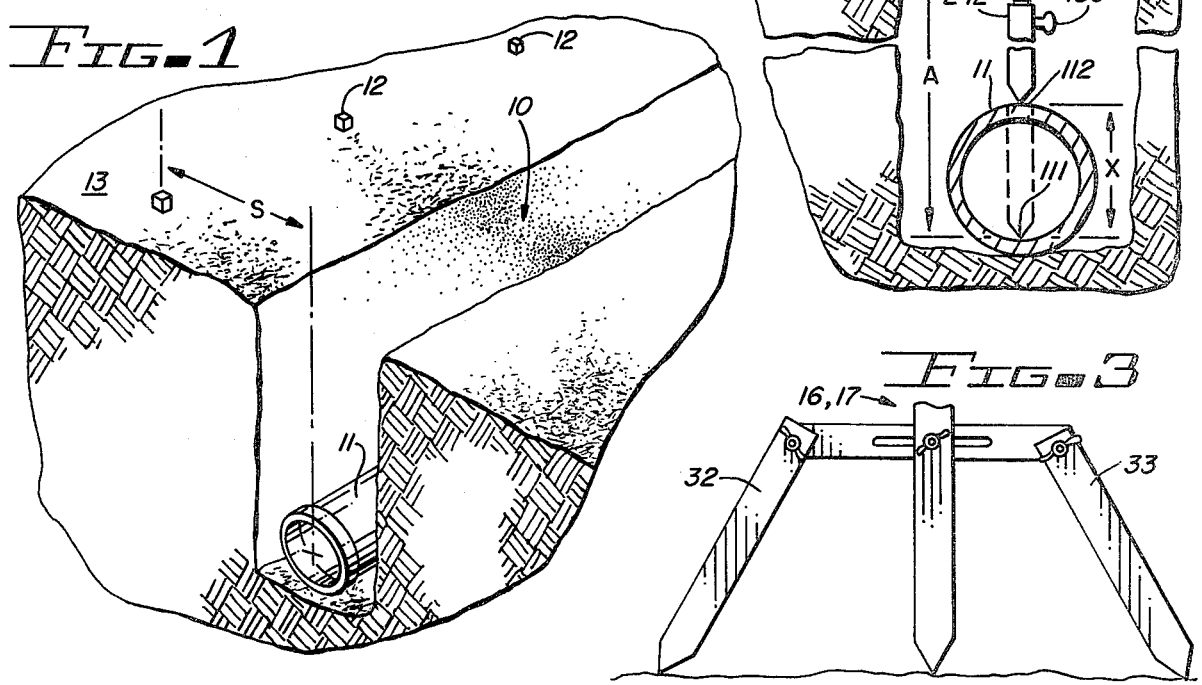
Fig. 1
Fig. 3

GRADE LINER

BACKGROUND

1. Field of the Invention

The invention relates to instrumentation for determining a grade line. In particular, the invention relates to measuring instrumentation for use in cooperation with grade stakes for determining the grade within a ditch wherein pipe, or the like, may be laid.

2. Prior Art

Where water or other fluid is to flow through a pipeline under the influence of gravity, it is necessary that a proper grade be established on which the pipe shall be laid. Preliminary measurements are generally made by skilled workers, such as surveyors. These skilled workers determine the run, or line along which the pipe shall be laid. Grade marking stakes are usually placed in the ground along a line offset a given distance from the run line of the pipe. A ditch will be dug in which the pipe will be positioned. To assure that the pipe shall lie along the proper grade, the grade stakes are marked with a depth reading measured from the top of the grade stake. If the ditch is everywhere dug to the depth indicated by adjacent grade stakes, a pipe laid in this ditch will lie on the proper grade to assure the gravity flow of liquid along the pipeline.

Since the pipe must couple to input and output devices which may already be in position prior to the installation of the pipeline, it is usual practice for the surveyors to indicate on the grade stakes, the depth from the top of the grade stake to the fluid flow line of the pipe. Thus, in setting pipe within the ditch, the construction workers will have to bear in mind the thickness of the wall of the pipe, or the pipe diameter, or both.

Because professional surveying equipment is so expensive, those skilled in the prior art have sought means for utilizing other, less expensive devices to serve the needs of those setting out grade stakes. Cotton in U.S. Pat. No. 3,170,239 utilizes a relatively inexpensive builders optical level to establish the run and then places a prism in the line of sight of the optical level to offset the line of sight as required to achieve the desired grade. Husby, in U.S. Pat. No. 1,231,162, provides a water level with an optical mount which will accommodate an optical device and permit its tilting to the degree necessary to establish the necessary grade for the run of pipe.

While the grade stakes are emplaced by workman of relatively high skill, the digging of the ditch and the placement of the pipe therein is generally assigned to workmen having less skill in matters of grade determination. Various devices have been conceived of, designed to aid these workman in placing the pipe at the proper depth and along the proper grade. Treloar in U.S. Pat. No. 1,476,340 discloses apparatus and method whereby several targets are positioned over the ditch in which the pipe is to be laid. A staff is placed upright with its bottom resting in the ditch. The workman sights over the staff and along a series of targets to test for proper grade alignment.

A more sophisticated technique for laying pipe on proper grade is disclosed by Trice in U.S. Pat. No. 3,591,926. Here a laser beam is positioned so as to transmit along the center line of the pipe run, the beam being tilted appropriate to the required grade along which the pipe run shall be established. The laser beam is positioned with the aid of a surveyor's instrument and a plumb bob on a surveyor's scale is utilized to establish the proper depth below the surveying instrument for the laser light source. The plumb bob is used to ensure that the line of the light beam passes through a point directly below the surveyor's sighting instrument.

A device for measuring the height of a quarry wall from the floor of the quarry is disclosed by Eldridge in U.S. Pat. No. 1,654,164. The device is actually a triangulation instrument which measures the slant distance from the instrument to the quarry floor. However, the tape which is utilized along the slant distance is calibrated so as to read the vertical distance from the top of the instrument to the floor of the quarry. Minor modification to the calibration of the tape measure would permit the readout to be referenced to the base of the triangulation device, which base could be established atop the surveyor's line stake.

While not necessarily pertinent to the establishment of grade lines, the disclosure of Olsen et al, U.S. Pat. No. 835,711, discloses a sighting device in which a mirror is utilized to rotate the line of sight through 90°. Such an arrangement is incorporated in one of the preferred embodiments of the invention disclosed herein.

In actual practice, today's techniques require the workman to establish a level grade at the terrain surface between the grade stake and the edge of the trench in which the pipe is to be emplaced. A board is then emplaced on this leveled surface and the end of the board extended outward over the trench a distance equal to the offset of the pipe from the grade stake. While one workman holds the board in position, another makes the depth measurement from the base of the board to the bottom of the ditch. This practice is difficult and clumsy and often provides an inaccurate measurement of grade.

It is therefore an objective of the invention to provide a simple but accurate means for obtaining a proper grade line.

It is a further objective of the invention to provide means and method whereby a single, unskilled laborer, may accurately determine the proper grade within a ditch in which pipe is to be laid.

It is a particular objective of the invention to provide means for establishing a grade line which means are adaptable for establishing said grade line at the bottom of the ditch, at the flow line of the pipe, or at the top, outer surface of the pipe.

It is a specific objective of the invention to establish a horizontal line of sight a selected distance above a grade stake and to intersect that line of sight, at a prescribed offset distance, with a vertical, calibrated measuring device having an uncalibrated length at the base of the measuring device, which uncalibrated length is related to the distance selected in establishing the line of sight above the grade stake, the zero calibration of said vertical measuring device beginning immediately above said uncalibrated length.

SUMMARY OF THE INVENTION

In summary description, the invention comprises a grade liner which is used in cooperation with grade stakes to determine the grade within a ditch. Means are provided for establishing a horizontal line of sight a selected rise distance "A" above a grade stake. Plumb means are provided which intersect the established horizontal sight line a given offset distance from said stake. The plumb means is calibrated such that the zero calibration is located a selected distance related to said rise distance "A" from the lower end of said plumb means. In a preferred embodiment of the invention, optical means, such as a target sighting rifle scope, are utilized in establishing a desired horizontal sight line. For the plumb means, a surveyor's tape measure may be utilized when coupled to a plumb bob, the length of which bob is selectively determinable and related to the distance said sight line lies above the grade stake. The length of the plumb bob is adjusted to compensate for the fact that the line of sight is raised through a distance A above the grade stake and for other factors such as pipe diameter and wall thickness. Means are provided for supporting said plumb means the desired offset distance from said grade stake. Such support means are emplaced above the selected line of sight such that any sagging or vertical displacement of the point of support will cause no error in reading the calibration of the plumb means at its intersection with the line of sight. Once the selected distance of the line of sight above the stake is established and the plumb bob adjusted to the proper length, then an unskilled workman may utilize the invention by adjusting the tape measure so as to bring the calibration on the tape measure which agrees with the established grade depth on the grade stake into intersection with the line of slight. This operation automatically places the bottom of the plumb bob at the desired depth below the surface of the grade stake. Only one relatively unskilled workman is required to operate the apparatus.

DESCRIPTION OF THE DRAWINGS

FIG. 1 is a perspective drawing illustrating a pipe emplaced in a ditch a given offset distance from a series of grade stakes.

FIG. 2 illustrates the grade liner of the invention showing the establishment of a horizontal line of sight above said grade stake and the intersection of that line of sight with a calibrated plumb means.

FIG. 3 illustrates a method, well known in the prior art, for providing additional stabilizing supports to a vertical upright to provide lateral stability.

DETAILED DESCRIPTION OF THE INVENTION

When a pipe is to be laid underground, it is generally desired that it be established on a grade such that fluid will flow continuously from one end to the other under the influence of gravity. Coincidental with the establishment of the pipe run on a desired grade, is the important requirement that the pipe shall begin and end at the proper depth to permit coupling the pipe run to input and output devices which may already be established in position. Trained surveyors are generally utilized for the task of establishing pipe run and the depth to which a ditch shall be cut with respect to variations in the surrounding terrain so as to establish the bottom of the ditch at a relatively constant grade level. For this purpose, a surveying team will establish a line of grade stakes. On each grade stake is indicated the depth to which the ditch shall be dug below the surface of the grade stake. To permit workman and machines to operate in the area and to excavate the ditch, the line of grade stakes is generally established at some fixed distance offset from the line along which the pipe run will be established. This offset distance is also indicated on the grade stakes.

FIG. 1 illustrates the arrangement noted above. A ditch 10 has been dug to accommodate a run of pipe 11. Offset a distance S from the center line of the pipe run, a line of grade stakes 12 have been established. Each grade stake indicates the depth to grade as measured from the top of the grade stake. In general, each grade stake 12 will have a different depth measurement indicated to accommodate variations in the surface of the earth 13 and to maintain the pipe run on the desired grade. Transferring that depth measurement from the top of grade stake 12 to the run of pipe 11, and doing it simply, efficiently, and accurately often presents significant problem to workers in the field. The invention was conceived to accomplish this task.

A presently preferred embodiment of the invention is illustrated in the elevation drawing of FIG. 2. The invention 14 is herein denoted a GRADE LINER. Grade liner 14 is comprised of a table 15 which is supported above the surface 13 of the terrain by front supports 16 and rear supports 17. Front and rear supports 16 and 17, respectively, are adjustable in height so as to establish the height of table 15 above terrain 13. For purposes of illustration, and not of limitation, each of these supports 16 and 17 is illustrated as comprising a pair of telescoping elements. Front support 16 is comprised of an upper member 161 which telescopes within a lower member 162. Rear support 17 is illustrated as comprising an upper member 171 which telescopes within a lower member 172. Each support 16 and 17 is provided with a locking mechanism 18 which, for simplicity of illustration, is illustrated as a thumb screw locking device. Thus, front support 16 is locked at a desired length by thumb screw 182 while the height of rear support 17 is maintained by locking screw 181.

Table 15 is illustrated as comprising several extension members 151 and 152 which again, for simplicity of illustration, are arranged in a telescoping arrangement, their position being maintained by locking screws 183 and 184.

Means are provided for maintaining table 15 at a 90° angle with respect to rear support 17. In FIG. 2, this is illustrated by bracket 19 which maintains the orthogonality of table 15 and rear support 17. When the height of rear support 17 has been established and is being maintained by use of locking screw 181, the height of front support 16 may be established in cooperation with bubble level 20 which is affixed to the top of table 15. When bubble level 20 indicates that table 15 is in a horizontal plane, locking screw 182 is utilized so as to maintain the relative positions of upper and lower members 161 and 162 of front support 16. With table 15 lying in a horizontal plane, rear support 17 will be established so as to lie in a vertical plane.

A storage case 21 for tape measure 22 is mounted to table 15 by any convenient, well known method. As is conventional, storage case 21 is provided with a crank 211 which, in cooperation with internal mechanism, permits the extension and retrival of tape 22 from storage case 21. Crank 211 cooperates further with an internal locking mechanism 212, not shown, to lock the tape in a fixed, selected position. A tape guide 23 is provided at the extreme end of table extension 152 so as to guide tape measure 22 from a generally horizontal position in which it is supported by table extensions 151 and 152 to a generally vertical position in which, when coupled to plumb bob 24, it functions as an integral part of a plumb means.

When rear support 17 is positioned on grade stake 12 and table extensions 151 and 152 have been adjusted to bring tape guide 23 a distance S equal to the required offset distance of the pipe run from stake 12, the plumb means comprising the vertical portion of measuring tape 22 and plumb bob 24 will lie in a vertical plane which includes a diameter of pipe 11, when pipe 11 is properly emplaced within ditch 10.

It will be here noted, but discussed in more detail later, that plumb bob 24 is illustrated as comprising two telescoping sections 241 and 242 whose relative positions are maintained by adjustment of locking screw 185.

Mounted in table 15 is optical means 25 illustrated here as a conventional rifle target scope having internal target sighting means 251. Optical means 25 is mounted to table 15 such that its optical axis is parallel to rear support 17. Mirror 26 is positioned along a line of sight of optical means 25 so as to bend the line of sight through an angle of 90°. It should be noted that while illustrated as a mirror 26, the means for bending the line of sight through 90° may be any optical means including reflectors or refraction devices.

With rear support 17 positioned on grade stake 12 and the height of front support 16 adjusted in cooperation with bubble level 20, table 15 will lie in a vertical plane and rear support 17 will lie in a vertical plane. Concurrently, the optical axis of optical scope 25 will lie in a vertical plane and mirror 26 will cause the line of sight through scope 25 to be bent through an angle of 90° so as to lie in a horizontal plane. When an observer's eye 27 is positioned to utilize scope 25, his line of sight 28 will be positioned so as to intersect the vertical portion of measuring tape 22 at the intersection point reference 29. The height A at which intersection point 29 lies above the top of grade stake 12 will be determined by the adjustment of the telescoping sections 171 and 172 of rear support 17. To assist in a determination of the magnitude of height A, a scale 30 may be affixed to upper member 171 of rear support 17.

Assume, for purposes of exposition, that the grade depth indicated on grade stake 12 is to be measured to the flow line established along the lower-most inner portion of pipe 11. Plumb bob 24 is affixed such that its top is at the zero calibration of tape measure 22. Telescoping sections 241 and 242 are adjusted so as to bring the overall length of plumb bob 24 to be equal to distance A, the rise distance of line of sight 28 above the top of grade stake 12. This is illustrated in FIG. 2 wherein plumb bob 24 includes the phantom outline portion extending to the lower most part inside pipe 11. Locking screw 185 is adjusted to maintain plumb bob 24 at the desired length A. Since the length of the plumb bob 24 has been adjusted to compensate for the rise distance A of the line of sight 28 above grade stake 12, the operator need only adjust crank 211 so as to establish intersection point 29 of his line of sight 28 with tape 22 at the same reading as is indicated on grade stake 12 without the need for other computation.

Assume, however, that the operator desires to establish the grade with reference to the outside diameter of pipe 11. Let the distance X, as illustrated in FIG. 2, be equal to the inner diameter of pipe 11 plus its wall thickness. Plumb bob 24 may then be adjusted so that its length is equal to A minus X. With plumb bob 24 so adjusted, the operator may resume his measurements again adjusting the intersection point 29 to correspond, to tape 22, with the depth reading indicated on grade stake 12. Again, no computations are required on the part of the operator after the length of plumb bob 24 has been established. Should it be desired that the grade shall be established to the bottom of the ditch 10, the length of plumb bob 24 need only be extended so as to be equal to A plus the wall thickness of pipe 11.

Since the grade depth measurement is read on tape 22 at intersection point 29 with respect to the zero calibration point of tape 22, the fact that table extension 151 and 152 may sag, as illustrated in phantom view in FIG. 2, will have little or no effect on the accuracy of the reading. Any slight deviation in offset measurement S will be immaterial and, in any event, may be compensated at the time that the extensions 151 and 152 are adjusted to establish offset distance S.

In order to provide lateral stability, either front support 16 or rear support 17 may be provided with stabilizing side supports 32 and 33 as illustrated in FIG. 3 and as is well known by established practices in the prior art.

Factors which may be considered in initially establishing the height of rise distance "A" are those, such as, establishing the optical pupil of rifle scope 25 at a convenient working height, as well as consideration of the accumulation of earth overburden between the grade stakes 12 and ditch 10. Once the rise distance "A" has been established, it will generally be maintained for all measurements. Similarly, once table extensions 151 and 152 have been extended and locked in place to establish offset distance S, there should be no further need to adjust the positions of extensions 151 and 152. When a determination is made of whether grade depth measurements are to be made with the plumb bob touching flow line 111 or the top most point 112 of pipe 11, or the bottom of ditch 10, the length of plumb bob 24 may be determined and established. The determination and setting of the various measurements may be performed by one reasonably skilled in the art before one less skilled in the art undertakes the actual grade depth measurements along the length of the ditch. The only adjustment that need be made by this workman who is less skilled is the establishment of the length of front support 16 which is adjusted in cooperation with bubble level 20 to place rear support 17 in a vertical plane and table 15 in a horizontal plane. This then establishes line of sight 28 on a true horizontal and assures that intersection 29 of line of sight 28 and tape measure 22 will occur the required rise distance "A" above the top of grade stake 12.

What I have disclosed is a grade liner which will permit a relatively unskilled workman to establish the grade with respect to either of the bottom of a ditch, the flow line of a pipe emplaced in a ditch, or the top of said pipe. After initial set-up, the workman may move the grade liner from grade stake to grade stake setting a calibrated plumb means to the grade depth indicated on the grade stake irrespective of the point of reference being taken at either of the three aforesaid positions, that is, the ditch bottom, the flow line, or the top the pipe. The invention is located at a grade stake and provides offset means for establishing a calibrated plumb means the required offset distance at which the center line of a pipe run is to be set with respect to the grade stakes. A horizontal line of sight is established a given rise distance above the top of the grade stake. At the base of the calibrated plumb line is coupled a length-adjustable plumb bob whose length is adjusted and established at a selected length related to the rise distance of the sight line above the grade stake. Deviations in length of the plumb bob from equivalence with the selected rise distance of the sight line take into account such factors as pipe diameters and pipe wall thicknesses. In any event, the zero calibration of the calibrated plumb line is established at the top of the plumb bob; thus, the measurement made at the intersection of the line of sight and calibrated plumb line will be equivalent to the grade depth measurement set forth on the particular grade stake at which the invention is established. The rise distance of said sight line is easily established by height adjustment means incorporated in the supports of the invention. Such factors as terrain variations and overburden deposited in digging of the ditch may be considered in establishing the rise distance of the sight line. Provision may be made whereby the optical means utilized in reading the calibrations on the plumb line may itself be mounted horizontally or may, as illustrated in the figures herein, be mounted vertically and coupled to means for bending the line of sight through a selected angle to bring the line of sight along a horizontal path. Calibration means may be provided both at the adjustable-length supports as well as on the adjustable-length plumb bob.

While I have described a particular embodiment of my invention, one which is presently preferred, it is recognized that those skilled in the art will conceive of other embodiments which embodiments, nevertheless, will fall within the spirit and scope of the appended claims.

Having disclosed my invention in the foregoing specification and attached drawings in such a clear and concise manner that those skilled in the art may readily understand and simply practice the invention, that which I claim is:

1. A grade liner for use in cooperating with grade stakes in determining grade with a ditch comprising:
   means for establishing the horizontal sight line a selected rise distance "A" above a grade stake;
   plumb means coupled to said means for establishing a horizontal sight line and intersecting said horizontal sight line comprising a linear scale the intersection of which with said horizontal sight line is viewable along said sight line the zero calibration of which scale is located a selected distance related to said rise distance "A" from the lower end of said plumb means;
   offset means coupled to and above said means for establishing a horizontal sight line for supporting said plumb means a selected offset distance from said grade stake; and
   means coupled to said offset means for locating the horizontal sight line established by said means therefore below said offset means so that the intersection of said linear scale with said horizontal line of sight will be uneffected by any sag in said offset means when the scale of reading of said linear scale is taken with respect to the lower end of said plumb means.

2. The grade liner of claim 1 wherein said selected distance from the lower end of said plumb means comprises a length equal to at least one of said rise distance "A" and distance $A \pm X$ wherein X is a desired compensating length.

3. The grade liner of claim 2 further comprising optical means positioned for sighting along said horizontal sight line and viewing said linear scale.

4. The grade liner of claim 3 wherein said optical means further comprises target sighting means centered on said horizontal sight line.

5. The grade liner of claim 6 wherein said plumb means further comprises:
   tape measure means; and
   plumb bob means having a length equal to at least one of said rise distance "A" and said distance $A \pm X$.

6. The grade liner of claim 5 wherein said plumb means further comprises storage means for storing and selectively determining the extended length of said tape measure means.

7. The grade liner of claim 6 wherein said offset means further comprises:
   means for supporting said storage means convenient to said optical means; and
   means for supporting at least a portion of said extended length of said tape measure means through at least a portion of said offset distance.

8. The grade liner of claim 7 further comprising table means having a horizontal surface and vertical support means coupled thereto.

9. The grade liner of claim 8 wherein said vertical support means further comprise length adjustment means for establishing said horizontal sight line at said selected rise distance "A".

10. The grade liner of claim 9 wherein said horizontal surface further comprises extension means for establishing said offset distance from said grade stake.

11. The grade liner of claim 10 further comprising level determining means coupled to said horizontal surface for setting said horizontal sight line in a true horizontal plane.

* * * * *

UNITED STATES PATENT AND TRADEMARK OFFICE
CERTIFICATE OF CORRECTION

PATENT NO. : 4,364,175
DATED : 21 December 1982
INVENTOR(S) : Levake et al

It is certified that error appears in the above—identified patent and that said Letters Patent is hereby corrected as shown below:

Claim 5, line 1, change "claim 6" to --claim 4--.

Signed and Sealed this

First Day of March 1983

[SEAL]

Attest:

Attesting Officer

GERALD J. MOSSINGHOFF

Commissioner of Patents and Trademarks